(12) United States Patent
Lee et al.

(10) Patent No.: US 11,209,206 B2
(45) Date of Patent: Dec. 28, 2021

(54) REFRIGERATOR

(71) Applicant: LG Electronics Inc., Seoul (KR)

(72) Inventors: Donghoon Lee, Seoul (KR);
Wookyong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 488 days.

(21) Appl. No.: 16/088,272

(22) PCT Filed: Mar. 21, 2017

(86) PCT No.: PCT/KR2017/003003
§ 371 (c)(1),
(2) Date: Sep. 25, 2018

(87) PCT Pub. No.: WO2017/164611
PCT Pub. Date: Sep. 28, 2017

(65) Prior Publication Data
US 2019/0086140 A1 Mar. 21, 2019

(30) Foreign Application Priority Data

Mar. 25, 2016 (KR) .......................... 10-2016-0036090

(51) Int. Cl.
*F25D 23/02* (2006.01)
*F25D 25/00* (2006.01)
(Continued)

(52) U.S. Cl.
CPC ............ *F25D 23/025* (2013.01); *F16H 19/04* (2013.01); *F25D 17/04* (2013.01); *F25D 23/02* (2013.01);
(Continued)

(58) Field of Classification Search
CPC ........ F25D 23/025; F25D 23/06; F25D 23/02; F25D 29/00; F25D 17/04; F25D 25/005;
(Continued)

(56) References Cited

U.S. PATENT DOCUMENTS 2,266,617 A * 12/1941 Steenstrup ............ F25D 23/025
62/286
2,346,287 A * 4/1944 Borgerd .................. F25D 17/06
62/179
(Continued)

FOREIGN PATENT DOCUMENTS

GB 446942 5/1936
JP S5631285 3/1981
(Continued)

OTHER PUBLICATIONS

International Search Report in International Application No. PCT/KR2017/003003, dated Jul. 18, 2017, 6 pages.
(Continued)

*Primary Examiner* — Eric S Ruppert
*Assistant Examiner* — Kirstin U Oswald
(74) *Attorney, Agent, or Firm* — Fish & Richardson P.C.

(57) ABSTRACT

According to an embodiment of the present invention, there is provided a refrigerator including: a cabinet which has a storage chamber therein; an inner door which is rotatably connected to a front surface of the cabinet, opens and closes a portion of the storage chamber, and has an access hole of a predetermined size; an accommodation case which is mounted on a rear surface or the inner door, and has a front surface which is opened so as to communicate with the access hole and a rear surface which has a plurality of cool air holes which are vertically spaced apart from each other; an outer door which is rotatably connected to the inner door at a front side of the inner door and selectively opens and closes the access hole; a shielder which is movably coupled to the rear surface of the accommodation case to selectively shield the plurality of cool air holes; and a driver which is provided in the accommodation case for vertically moving the shielder.

12 Claims, 13 Drawing Sheets

(51) Int. Cl.
*F25D 29/00* (2006.01)
*F16H 19/04* (2006.01)
*F25D 23/06* (2006.01)
*F25D 17/04* (2006.01)

(52) U.S. Cl.
CPC ........... *F25D 23/06* (2013.01); *F25D 25/005* (2013.01); *F25D 29/00* (2013.01); *F25D 29/003* (2013.01); *F25D 2201/10* (2013.01); *F25D 2317/00* (2013.01)

(58) Field of Classification Search
CPC ............... F25D 29/003; F25D 2201/10; F25D 2317/00; F25D 23/028; F25D 23/062; F25D 29/005; F25D 2700/02; F25D 2323/023; F16H 19/04; Y02B 40/00
USPC .......................................................... 62/408
See application file for complete search history.

(56) References Cited

U.S. PATENT DOCUMENTS

| | | | | |
|---|---|---|---|---|
| 3,792,593 | A * | 2/1974 | Loos | F24F 1/027 62/262 |
| 4,688,393 | A * | 8/1987 | Linstromberg | F25D 17/045 62/180 |
| 5,209,082 | A * | 5/1993 | Ha | F25D 23/025 312/236 |
| 5,675,985 | A * | 10/1997 | Lee | F25D 17/045 62/408 |
| 5,816,061 | A * | 10/1998 | Lee | F25D 17/065 62/187 |
| 5,941,087 | A * | 8/1999 | Lee | F25D 17/045 62/256 |
| 6,014,865 | A * | 1/2000 | Kim | F25D 17/045 62/256 |
| 6,032,480 | A * | 3/2000 | Kim | F25D 17/045 62/187 |
| 6,073,458 | A * | 6/2000 | Kim | F25D 17/045 62/187 |
| 6,101,825 | A * | 8/2000 | Park | B60H 1/00692 454/156 |
| 6,224,480 | B1 * | 5/2001 | Le | B60H 1/00692 454/156 |
| 6,415,622 | B2 * | 7/2002 | Kim | F24F 1/005 62/409 |
| 6,718,780 | B2 * | 4/2004 | Cho | F25D 17/045 62/186 |
| 6,793,573 | B2 * | 9/2004 | Ueda | B60H 1/00692 251/248 |
| 6,910,340 | B2 * | 6/2005 | Nowak | F24F 13/12 236/49.5 |
| 7,275,388 | B2 * | 10/2007 | Joo | F24F 1/0014 62/408 |
| 9,562,620 | B2 * | 2/2017 | Da Pont | F16K 31/002 |
| 2003/0233843 | A1 * | 12/2003 | Ueda | B60H 1/00692 62/408 |
| 2004/0011072 | A1 * | 1/2004 | Inoue | F24F 1/022 62/408 |
| 2010/0043482 | A1 * | 2/2010 | Kim | F24F 1/027 62/408 |

FOREIGN PATENT DOCUMENTS

| | | | |
|---|---|---|---|
| JP | H0293273 | 4/1990 | |
| JP | 10318649 A * | 12/1998 | ........... F25D 17/065 |
| KR | 100193707 | 6/1999 | |
| KR | 20000053871 | 9/2000 | |
| KR | 20040059619 | 7/2004 | |
| KR | 20040082806 | 9/2004 | |
| KR | 20050000613 | 1/2005 | |
| KR | 20050000613 A * | 1/2005 | ............. F25D 23/02 |
| KR | 1020100122155 | 11/2010 | |
| KR | 1020100130357 | 12/2010 | |
| KR | 1020110089790 | 8/2013 | |
| KR | 101307735 | 9/2013 | |
| KR | 1020160021438 | 2/2016 | |

OTHER PUBLICATIONS

EP Supplementary Search Report in European Application No. EP 17770581, dated Oct. 24, 2019, 8 pages.

\* cited by examiner

REFRIGERATOR

CROSS-REFERENCE TO RELATED APPLICATIONS

This application is a National Stage application under 35 U.S.C. § 371 of International Application No. PCT/KR2017/003003, filed on Mar. 21, 2017, which claims the benefit of Korean Application No. 10-2016-0036090, filed on Mar. 25, 2016. The disclosures of the prior applications are incorporated by reference in their entirety.

TECHNICAL FIELD

The present invention relates to a refrigerator.

BACKGROUND ART

In general, a refrigerator includes a cabinet which is filled with a heat insulating material therein; an evaporator which forms a food storage space for blocking heat penetrating from the outside by a door coupled to the cabinet and absorbs heat inside the food storage space; and a cooling cycle which includes a heat radiating device for radiating heat to the outside of the food storage space.

In addition, the refrigerator may include any one or both of a refrigerating chamber which stores food at an above-zero temperature and a freezing chamber which stores food at a sub-zero temperature.

An accommodation case such as a door basket as well as a storage case including a home bar may be mounted on a rear surface of a refrigerating chamber door.

In the refrigerator disclosed in the following related art, an accommodation device which accommodates foods is provided on the rear surface of the door. The refrigerator includes a door assembly which includes an inner door and an outer door provided on a front surface of the inner door. The refrigerator has a structure which can open an outer door to accommodate food in the accommodation member mounted on the rear surface of the inner door, or take out foods accommodated in the accommodation member mounted on the rear surface of the inner door.

However, the refrigerator of the related art as described above has the following problems.

In a case of the refrigerator of the related art disclosed in the related art 1, when the door provided with the home bar is opened or when the inner door is opened, there is a problem that the external air flows into the home bar or the storage case provided on the rear surface of the door and thus food stored in the home bar or the accommodation case goes bad.

In a case of the refrigerator of the related art disclosed in the related art 2, when the inner door (rear door) is closed and the outer door (front door) is opened, the external air flows into the housing provided in the inner door.

At this time, since the amount of external hot air flowing into the housing is significantly larger than the amount of cool air supplied from the refrigerating chamber to the housing, the temperature inside the housing rapidly increases. As a result, the food accommodated in the housing easily goes bad.

In addition, since the size of a cool air hole formed in the housing is small, it takes a long time to lower the inner temperature of the housing to the set temperature after the outer door is opened and closed. Therefore, under the condition that the number of times of opening and closing of the outer door is larger than the number of times of opening and closing of the inner door, the practicality of the housing is deteriorated.

Related Art 1: Korea Laid-Open Patent Publication No. 2011-0069790 (Aug. 9, 2011)

Related Art 2: Korea Laid-Open Patent Publication No. 2010-0122155 (Nov. 22, 2010)

DISCLOSURE

Technical Problem

The present invention has been proposed in order to solve the problems described above.

Technical Solution

In order to solve the problems described above, according to an embodiment of the present invention, there is provided a refrigerator including: a cabinet which has a storage chamber therein; an inner door which is rotatably connected to a front surface of the cabinet, opens and closes a portion of the storage chamber, and has an access hole of a predetermined size; an accommodation case which is mounted on a rear surface of the inner door, and has a front surface which is opened so as to communicate with the access hole and a rear surface which has a plurality of cool air holes which are vertically spaced apart from each other; an outer door which is rotatably connected to the inner door at a front side of the inner door and selectively opens and closes the access hole; a shielder which is movably coupled to the rear surface of the accommodation case to selectively shield the plurality of cool air holes; and a driver which is provided in the accommodation case for vertically moving the shielder.

In order to solve the problems described above, according to another embodiment of the present invention, there is provided a refrigerator including: a cabinet which has a storage chamber therein; a door which is rotatably coupled to a front surface of the cabinet and opens and closes at least a portion of a front surface portion of the storage chamber; an accommodation case which is mounted on a rear surface of the door and has a plurality of cool air holes vertically spaced apart from each other on a rear surface thereof; a shielder in which a plurality of opening portions are vertically spaced apart from each other and is movably mounted on the rear surface of the accommodation case to selectively open and close the plurality of cool air holes; driver which vertically moves the shielder; a door switch which is mounted on a front surface of the cabinet and detects opening and closing of the door; and a control unit which receives the opening and closing signals of the door from the door switch and operates the driver.

Advantageous Effect

The refrigerator according to the embodiment of the present invention configured as described above has the following effects.

Firstly, in a case where only the outer door is opened, since an opening portion of the rear portion of the accommodation case is shielded by the shielder so that the hot air outside the refrigerator is prevented from flowing into the refrigerating chamber, the problem that the load on the refrigerating chamber increases is improved.

Secondly, when the outer door is opened and then is closed, the shielder is lifted to open the opening portion of the rear surface of the accommodation case so that the refrigerating chamber cool air flows into the accommodation case. Therefore, the temperature inside the accommodation case rapidly drops, and the possibility that the food stored in the accommodation case goes bad can be minimized.

Thirdly, in a case where the shielding module including a guide member and an elastic member is applied, since the shielding module is operated only by the force of the user who opens and closes the outer door, the electric energy is not consumed for operating the shielding module.

Fourthly, when the shielding module according to the embodiment of the present invention is applied, since there is no need to provide a separate duct or a blowing fan for supplying cool air to the accommodation case, the manufacturing cost of the refrigerator is reduced. Furthermore, there is an advantage that the internal volume of the refrigerating chamber can be prevented from being reduced by the duct or the blowing fan.

Fifthly, according to a structure in which the shielding cover is lifted and lowered by the driving motor when the opening of the inner door is detected, the shielder shields the opening portion of the rear surface of the accommodation case regardless of whether or not the outer door is opened. Therefore, in a state where the outer door is closed and the inner door is opened, there is an advantage that hot air outside the refrigerator does not flow into the accommodation case through the rear surface of the accommodation case.

Sixthly, in a case where the inner door is closed and only the outer door is opened, since the shielder shields the opening portion of the rear surface of the accommodation case, the hot air outside the refrigerator is prevented from flowing into the inside of the refrigerator.

BEST MODE

Hereinafter, a refrigerator having a cool air shielding structure according to an embodiment of the present invention will be described in detail with reference to the drawings.

Figure 1:
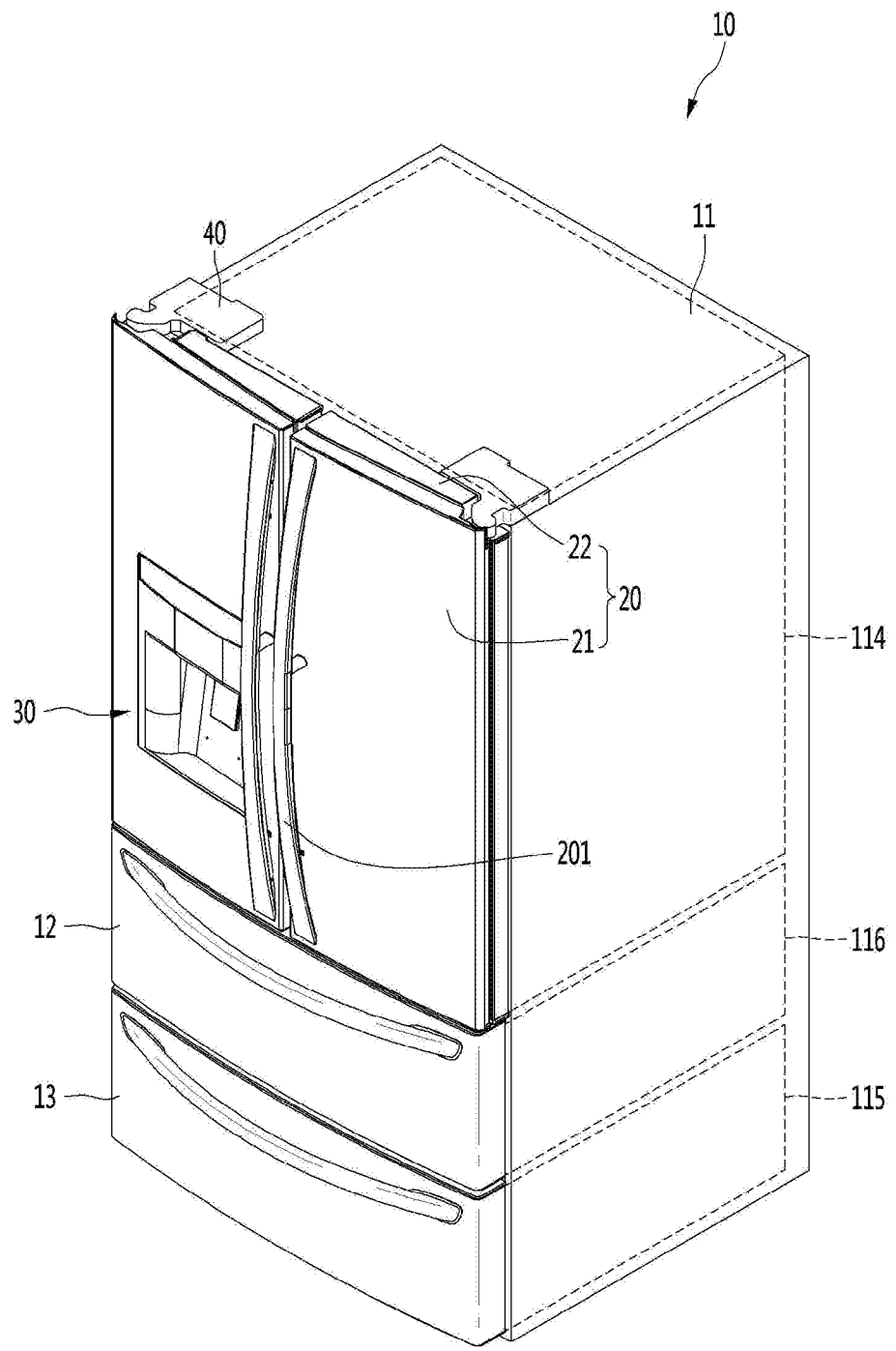
FIG. 1 is a perspective view illustrating a refrigerator according to an embodiment of the present invention.

FIG. 1 is a perspective view of a refrigerator according to an embodiment of the present invention.

With reference to FIG. 1, the refrigerator 10 according to the embodiment of the present invention may include a cabinet 11 which has a storage chamber therein, and a door which selectively opens and closes the storage chamber.

Specifically, the storage chamber provided in the cabinet 11 may include a refrigerating chamber 114 which keeps food in a refrigerated state, a freezing chamber 115 which keeps the food in a frozen state, and a switching chamber 116 which is variable from a refrigerating temperature to a freezing temperature or from a freezing temperature to a refrigerating temperature.

In addition, the door may include a refrigerating chamber door assembly 20 which opens and closes the refrigerating chamber 114, a freezing chamber door 13 which opens and closes the freezing chamber 115, and a switching chamber door 12 which opens and closes the switching chamber 116.

The refrigerating chamber door assembly 20 may be a rotatable door, while the switching chamber door 12 and the freezing chamber door 13 may be a drawer type door.

Specifically, the refrigerating chamber door assembly 20 may be rotatably connected to left and right edges of the front surface of the cabinet 11, respectively. The refrigerating chamber door assembly 20 may include an inner door 22 which is rotatably connected to a front surface of the cabinet 11 and an outer door 22 which is disposed on a front surface of the inner door 22 and is rotatably connected to one side edge of the inner door 22.

The refrigerating chamber door assembly 20 including the inner door 22 and the outer door 21 is disposed on only one of the left and right sides of the cabinet 11 and a single rotatable door may be provided on the other side or may be provided on both the left side and the right side of the cabinet 11.

Meanwhile, a dispenser 30 for extracting water and/or ice may be installed on the outer door 21 of the refrigerating chamber door assembly 20 coupled to the left side of the cabinet 11, and an ice making chamber for making ice can be installed in the inner door 22.

In addition, the refrigerator 10 may further include a handle 201 which is provided on the front surface of the outer door 22, doors provided in the switching chamber door 12 and the freezing chamber door 13, respectively, and a hinge assembly 40 which causes the refrigerating chamber door assembly 20 to be rotatably connected to the cabinet 11.

Specifically, the hinge assembly 40 may include a first hinge unit which connects the cabinet 11 to the inner door 22 and a second hinge unit which connects the inner door 22 to the outer door 21.

Figure 2:
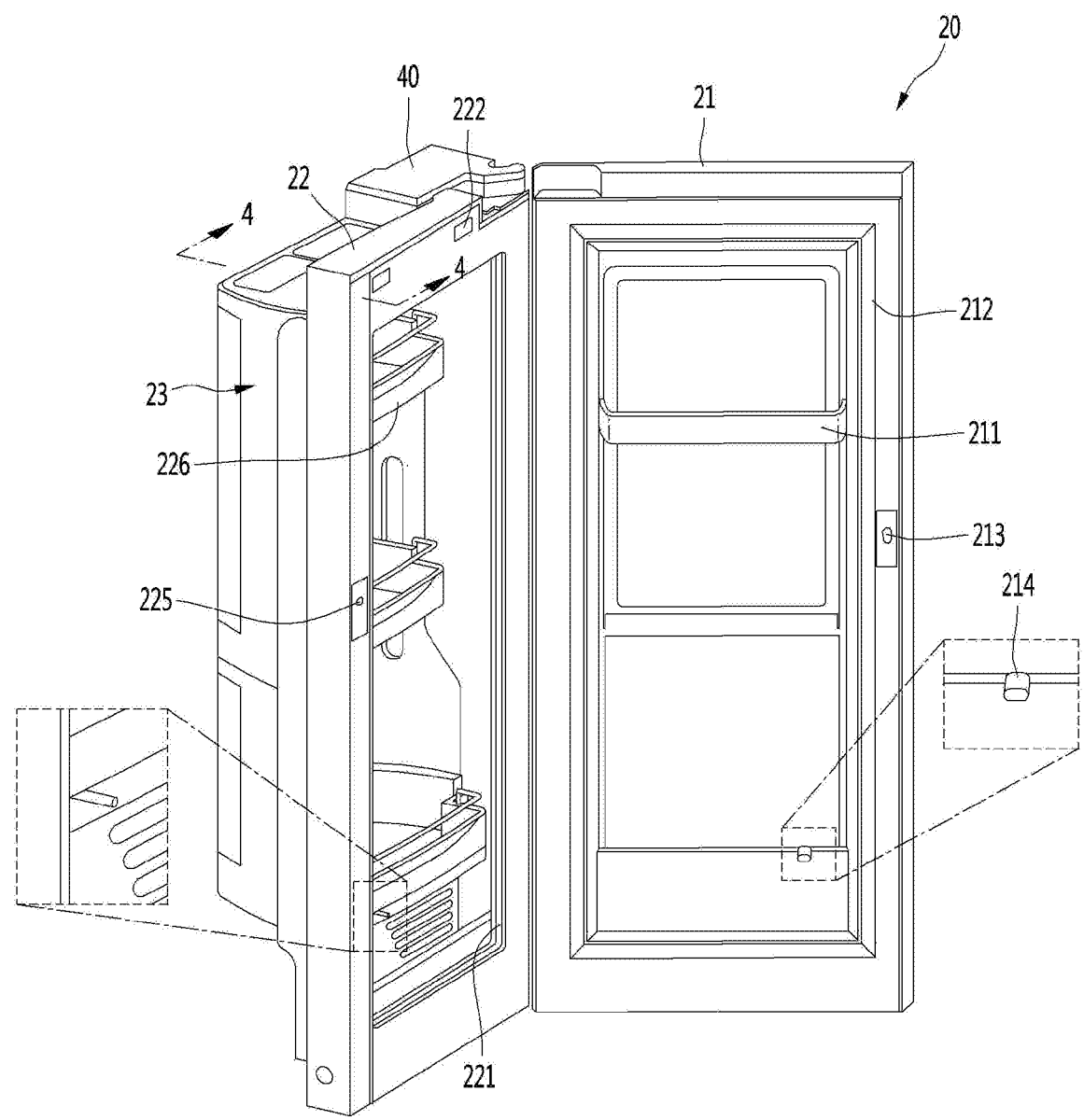
FIG. 2 is a front perspective view illustrating a refrigerating chamber door assembly constituting the refrigerator according to an embodiment of the present invention.
Figure 3:
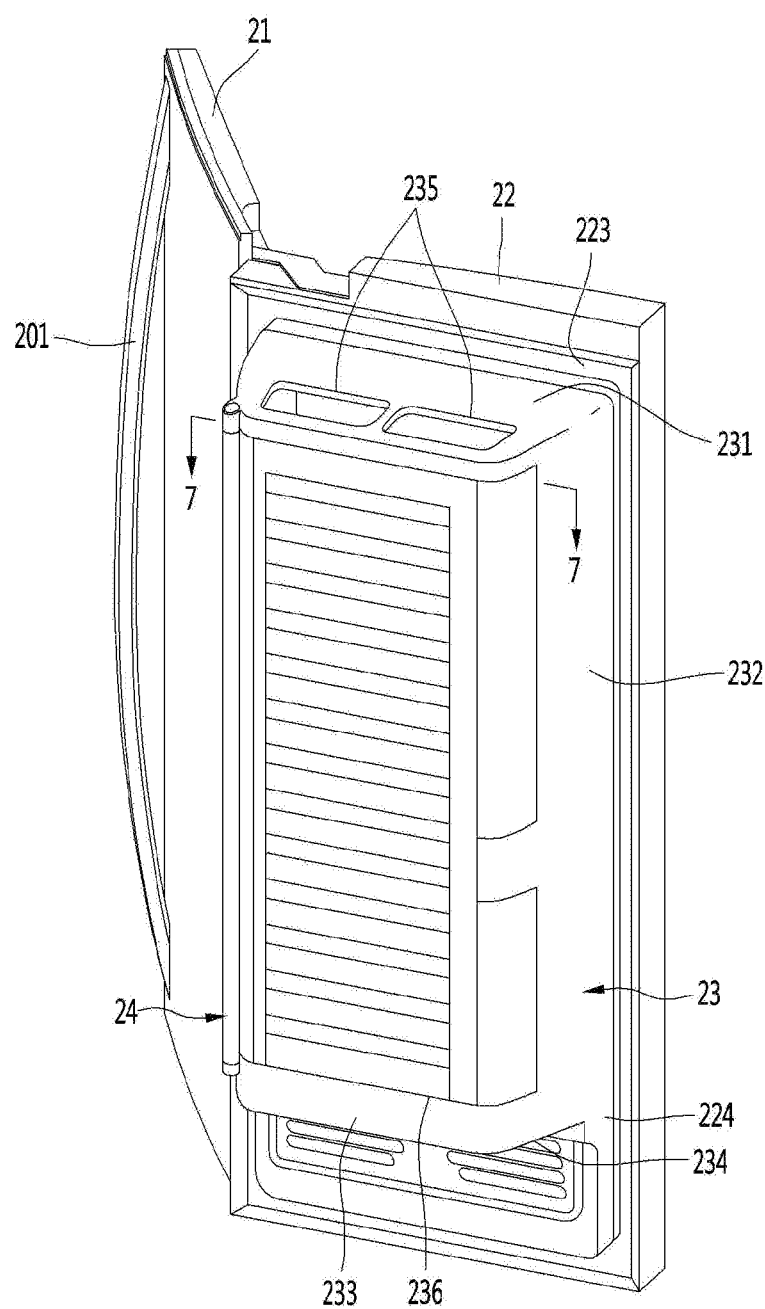
FIG. 3 is a rear perspective view illustrating the refrigerating chamber door assembly.

FIG. 2 is a front perspective view of the refrigerating chamber door assembly constituting a refrigerator according to an embodiment of the present invention, and FIG. 3 is a rear perspective view of the refrigerating chamber door assembly.

With reference to FIGS. 2 and 3, the refrigerating chamber door assembly 20 according to the embodiment of the present invention includes the inner door 22, and an outer door 21 which are rotatably disposed on the front surface of the inner door 22, as described above.

The width and length of the outer door 21 may be the same as those of the inner door 22. A plurality of door baskets 211 may be vertically spaced from each other in the rear surface of the outer door 21. The door basket 211 may be detachably mounted on the rear surface of the outer door 21.

A gasket 212 is surrounded the rear edge of the outer door 21. A latch unit 213 may be formed on the opposite side edge of the side surface of the outer door 21 on which the rotation shaft is formed. The latch unit 213 may be disposed outside the gasket 212.

In addition, a pressing protrusion 214 protrudes from one side of the rear surface of the outer door 21 and the pressing protrusion 214 pushes up the shielder constituting the shielding module when the outer door 21 is closed. The shielding module and the shielder are described in more detail below.

Meanwhile, an access opening 221 having a predetermined size is formed on the inner door 22 and an accommodation case 23 is mounted on a rear surface of the inner door 212. The access hole 221 is an opening portion which allows the user's hand to be capable of accessing the interior of the accommodation case 23 in a state where the inner door 22 is closed and the outer door 21 is opened.

Here, the gasket 212 surrounded the rear surface of the outer door 21 is in close contact with the front surface of the inner door 22 and is surrounded along the outer edge of the access hole 221. Therefore, in a state where the outer door 21 is in close contact with the front surface of the inner door 22, that is, in a state where the outer door 21 is closed, a phenomenon that cool air flows out between the inner door 22 and the outer door 21 is blocked.

A plurality of door baskets 226 may be mounted in the accommodation case 23 and the plurality of door baskets 226 may be vertically spaced apart from each other in the accommodation case 23.

In addition, a door dike 224 may protrude from the rear edge of the inner door 22 and a front end portion of the accommodation case 23 may be coupled to the door dike 224. A gasket 223 is surrounded an edge of the rear surface of the inner door 22 corresponding to the outside of the door dike 224. In a state where the inner door 22 is in close contact with the front surface of the cabinet 11, that is, in a state where the inner door 22 is closed, the gasket 223 is in close contact with the front surface of the cabinet 11, and thus the phenomenon that the cold air inside the refrigerating chamber 114 is leaked to the outside is blocked.

In addition, the plurality of door baskets 226 may be detachably coupled to both side surface portions of the accommodation case 23 or the door dike 224.

In addition, the locking unit 225 may be formed at the front surface portion of the inner door 22, specifically, a position corresponding to the latch unit 213 in a state where the outer door 21 is closed. When the outer door 21 is in close contact with the front surface of the inner door 22, the latch unit 213 is caught by the locking unit 225 so that the outer door 21 can be kept in a state of being closed.

In addition, the door switch 222 may be formed on the upper side or the lower side of the front surface portion of the inner door 22. The door switch 222 may be disposed farther from the rotation shaft of the outer door 21 or may be disposed near the rotation shaft. Specifically, when the outer door 21 is closed or opened, the door switch 222 is pressed or released from the pressed state, and a control unit (not illustrated) of the refrigerator can determine whether or not the door 21 is opened or closed by detecting a state of the door switch 222.

Of course, a door switch (not illustrated) may be provided on the front surface of the cabinet 11 to determine whether or not the inner door 22 is opened or closed by the control unit of the refrigerator 10.

Meanwhile, the accommodation case 23 is opened at a front surface thereof and communicates with the access hole 221. The accommodation case 23 may include an upper surface portion 231, side surface portions 232 which extends downward from edges of both side surfaces of the upper surface portion 231, a rear surface portion which extends downward from the rear end portion of the upper surface portion 231, and a lower surface portion 234 (see FIG. 4) which connects the lower end portion of the rear surface portion 233 and the lower end of the side surface portion 232.

Specifically, one or a plurality of upper cool air inflow holes 235 may be formed on the upper surface portion 231, and may not be formed according to design conditions. Side cold air inflow holes 237 (see FIG. 4) may be formed in a side surface portion of the pair of side surface portions 232 near the rotation shaft of the inner door 22, and may not be formed according to design conditions. In a state where the inner door 22 is closed, cool air discharge holes may be formed on a side surface of the refrigerating chamber 114 corresponding to the side cold air inflow holes 237. A cool air duct connecting the evaporator chamber and the cool air discharge holes may extend inside the side wall of the cabinet 11 to supply the cool air of the evaporator chamber to the accommodation case.

In addition, an opening portion 236 is formed in the rear surface portion 233 of the accommodation case 23 and the opening portion 236 can be selectively shielded by the shielding module 24. The shielding module 24 may be rotatably connected to an edge of the side surface or the rear surface portion 233 of the accommodation case 23. As an embodiment, the shielding module 24 may be rotatably connected to a side end portion of the rear surface portion 233 of the accommodation case 23 close to the rotation shaft of the inner door 22.

Hereinafter, the configuration and function of the shielding module will be described in more detail with reference to the drawings.

Figure 4:
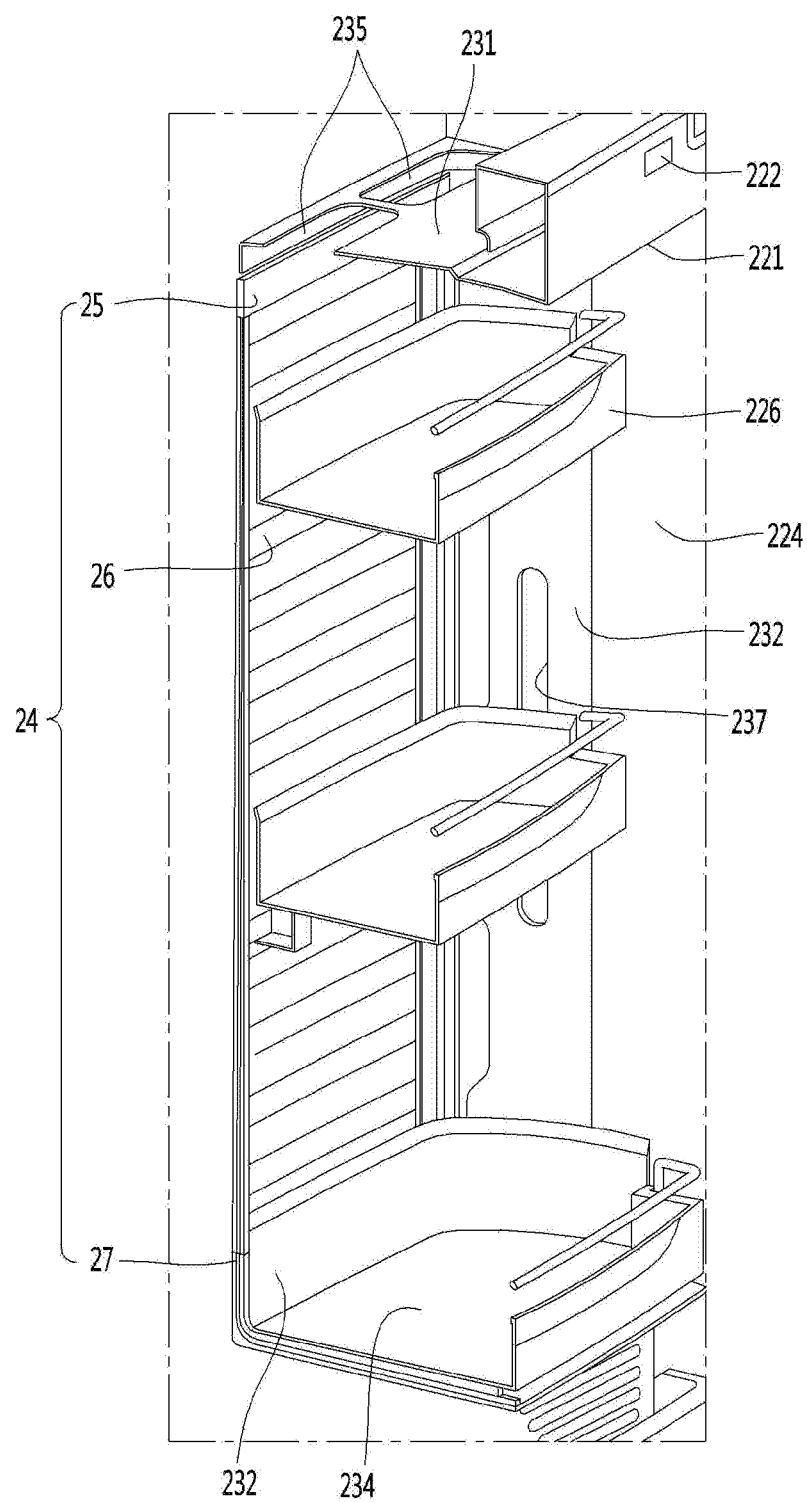
FIG. 4 is a longitudinal sectional cutaway perspective view taken along line 4-4 in FIG. 2.
Figure 5:
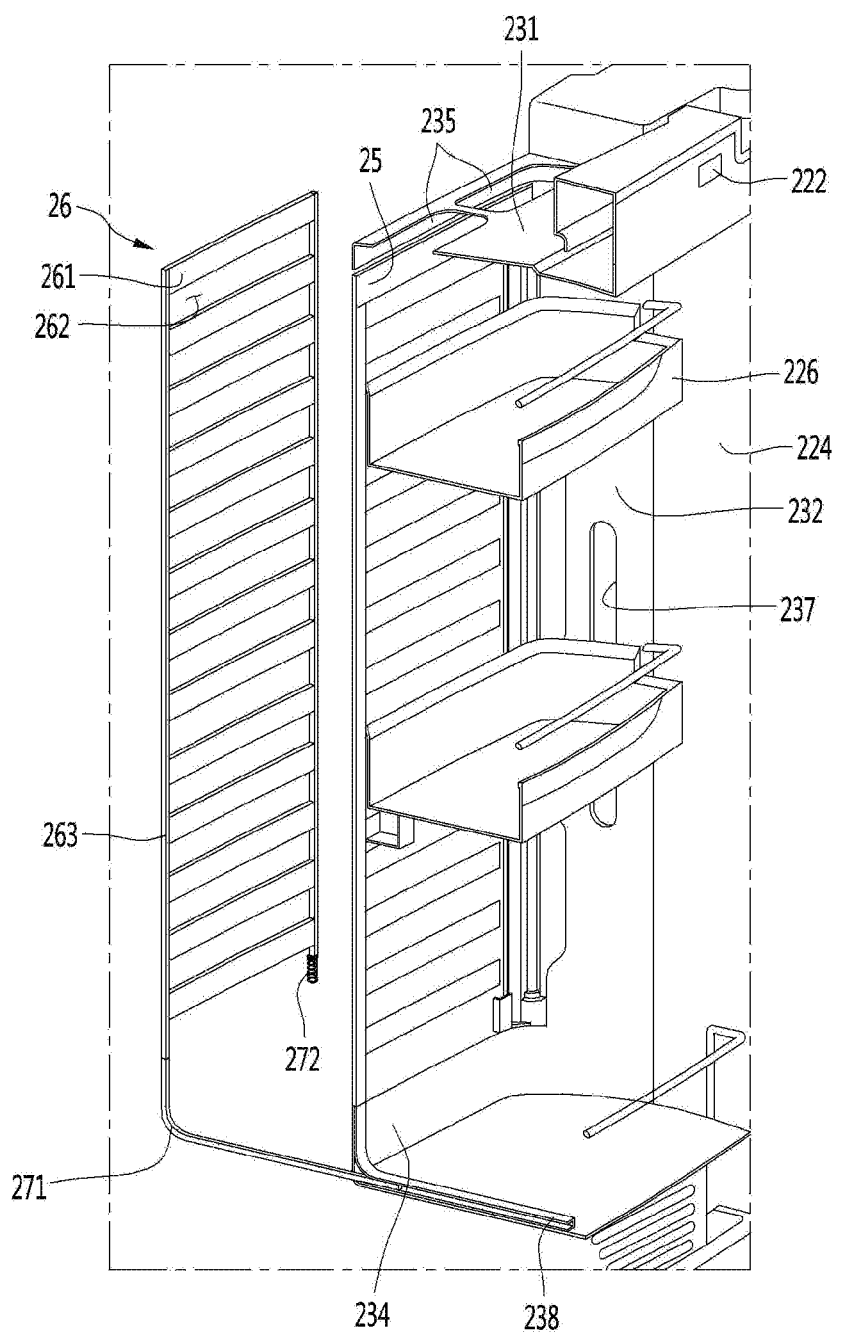
FIG. 5 is a longitudinal sectional cutaway exploded view taken along line 4-4 of FIG. 2.
Figure 6:
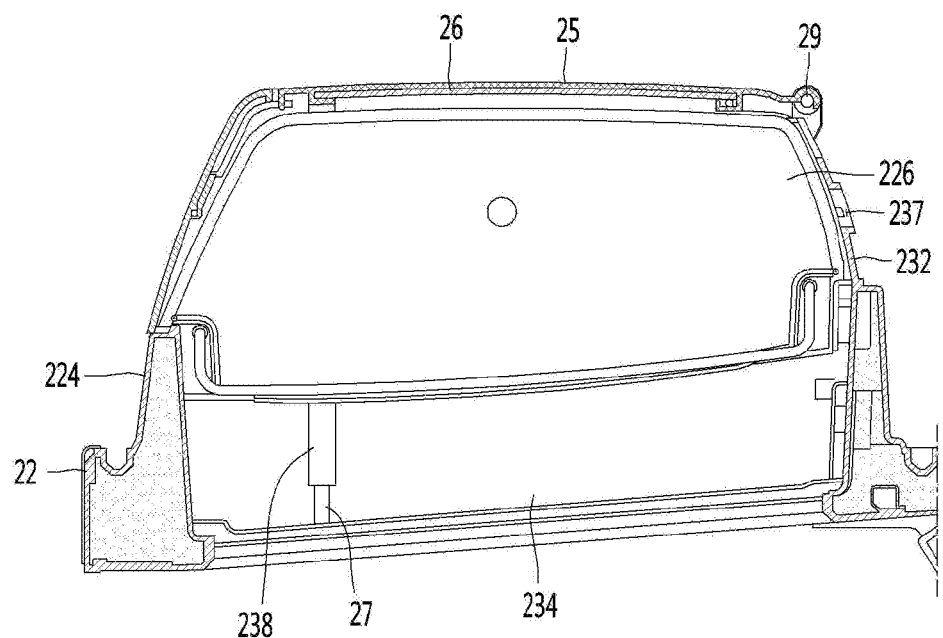
FIG. 6 is a perspective view of a case cover constituting a shielding module according to an embodiment of the present invention.
Figure 7:
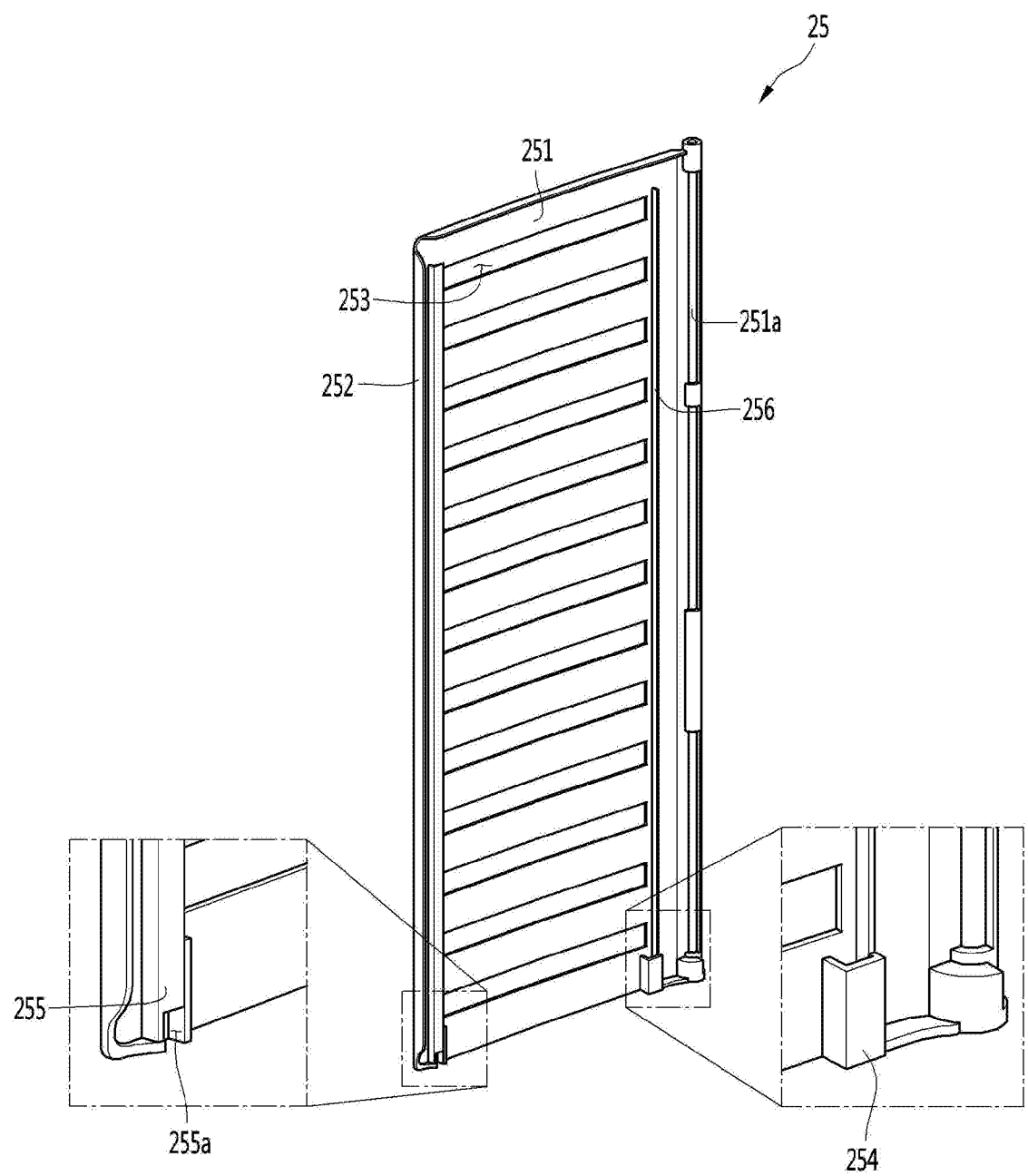
FIG. 7 is a cross-sectional view taken along line 7-7 of FIG. 3.

FIG. 4 is a longitudinal sectional cutaway perspective view taken along line 4-4 in FIG. 2, FIG. 5 is a longitudinal sectional cutaway exploded view, FIG. 6 is a perspective view illustrating a case cover constituting a shielding module according to an embodiment of the present invention, and FIG. 7 is a cross-sectional view taken along line 7-7 of FIG. 3.

With reference to FIGS. 4 to 7, the shielding module 24 mounted on the accommodation case 23 according to the embodiment of the present invention may include a case cover 25 which selectively shields the opening portion 236 formed on the rear surface of the accommodation case 23, a shielder 26 which is slidably coupled to the case cover 25, and a driver 27 which can vertically move the shielder 26.

Specifically, the driver 27 may include a guide bar 271 which is disposed at one side edge of the lower end portion of the shielder 26 and an elastic member 272 which is connected to the other side edge of the lower end portion of the shielder 26. The guide bar 271 is formed to be movable along the lower surface portion 234 and the rear surface portion 233 of the accommodation case 23 in a front and rear direction. The guide bar 271 has to have flexibility which can bend at corner portions where the lower surface portion 234 and the rear surface portion 233 of the accommodation case 23 meet each other and a certain degree of rigidity which can push up the shield member 26. Therefore, the guide bar 271 may be made of a plastic material having a rigidity that can be returned to the original position after bending and can push up the shielder 26.

A guide rib 238 which accommodates the guide bar 271 is formed on the lower surface portion 234 and the rear surface portion 233 of the accommodation case 23. The guide ribs 238 extend in the shape of an "n"-shaped cross-section to the lower surface portion 234 and the rear surface portion 233 so that the guide bar 271 can move within the guide ribs 238.

Alternatively, an elongated hole may be formed to penetrate the lower surface portion 234 and the rear surface portion 233, and the guide bar 271 may be accommodated in the elongated hole.

In addition, the shielder 26 includes a shielding main body 261 and a left frame 263 and a right frame 264 which extend perpendicularly from the left and right edges of the shielding main body 261. A plurality of opening portions 262 are vertically spaced apart from each other in the shielding main body 261. Here, a portion of the shielding main body 261 excluding the opening portion 262 may be defined as a shielding portion. The shielding main body 261 may be defined as a structure in which the opening portion and the shielding portion are alternately formed in a vertical direction.

In addition, one end, specifically, the upper end of the elastic member 272 is connected to the lower end of the right frame 264. The other end, that is, the lower end of the elastic member 272 may be placed on or coupled to the bottom of an elastic member accommodation portion 254 (see FIG. 7) provided in the case cover 25.

Even if the lower end of the elastic member 272 is not fixed to the elastic member accommodation portion 254, there is little possibility that the elastic member 272 is separated from the elastic member accommodation portion 254 by the load of the shielder 26. However, considering the possibility that the elastic member 272 is lifted from the bottom of the elastic member accommodation portion 254 and then lowered and struck the bottom of the elastic member accommodation portion 254 to generate noise, the elastic member 272 may be fixedly coupled to the elastic member accommodation portion 254.

Meanwhile, the case cover 25 may be defined as a rear door of the accommodation case 23, as a member for opening and closing an opening portion which is formed in the rear surface portion 233 of the accommodation case 23. The side edge of the case cover 25 is rotatably connected to the edge of the opening portion of the accommodation case 23 by a hinge shaft 29.

As illustrated in FIG. 3, the left or right edge of the case cover 25 is rotatably connected to the left or right edge of the rear surface portion of the accommodation case 23 by the hinge shaft 29.

Specifically, the case cover 25 may be defined as a component of the shielding module 24 and may be defined as a component which constitutes the accommodation case 23, as means for opening and closing an opening portion of the rear surface of the accommodation case 23.

More specifically, the user can open the opening portion by rotating the case cover 25 in a state where the inner door 22 is opened and the accommodation case 23 is separated from the refrigerating chamber 114. In this state, the user can take out the food accommodated in the accommodation case 23.

The case cover 25 may include a cover body 251 which is formed to have a size corresponding to the size of the opening portion, a hinge shaft accommodation portion 251a which is formed at one side of the left side edge and the right side edge of the cover body 251, a side fastening rib 252 which is bent or rounded at the other side of the left side edge and the right side edge of the cover body 251, and an upper fastening rib 257 which is bent or rounded at the upper end of the cover body 251.

Specifically, the side fastening ribs 252 and the upper fastening ribs 257 may be bent or rounded to be inserted into the opening portion formed in the rear surface of the accommodation case 23. Alternatively, slits may be formed on the upper and side ends of the rear surface of the accommodation case 23, respectively, and the upper fastening ribs 257 and the side fastening ribs 252 may be fitted to the slits. Then, it is possible to prevent accidental opening of the case cover 25 in a state of being closed or opening of the case cover 25 due to inertia in an opening process of the inner door 22.

Alternatively, a locking means or a hooking means such as a latch, a hook, a magnet, or the like may be provided on one side edge, specifically, on the opposite edge of the side edge of the case cover 25, where the hinge shaft 29 is provided.

Meanwhile, the cover body 251 may be formed with a plurality of cool air holes 253 vertically spaced apart from each other. The cool air holes 253 may have the same size as the opening portion 262 formed in the shielder 26. Here, the cool air holes 253 should be formed to a size that can be completely shielded by the shielding portion (portion between adjacent opening portions 262) of the shielder 26. Therefore, the opening portion 262 of the shielder 26 should be equal to or smaller than the size of the cool air hole 253.

In addition, the first guide ribs 255 and the second guide ribs 256 can be vertically elongated on the front surface of the cover body 251, specifically, on the left and right edge portions of the cool air hole 253, respectively.

Specifically, any one of the first guide rib 255 and the second guide rib 256 may be bent to have an L-shaped cross-sectional shape as illustrated. Then, the shielder 26 can be prevented from being separated from the case cover 25 by the guide ribs having the L-shaped cross-sectional shape.

The other one of the first guide rib 255 and the second guide rib 256 may be a 1-shaped rib and thus may perform only a function of preventing the shielder 26 from tilting laterally when the shielder 26 is lifted and lowered.

In the present embodiment, the first guide rib 255 may be a rib having an L-shaped cross-section and the second guide rib 256 may be a 1-shaped rib.

In addition, a cut-out portion 255a may be formed at the lower end of the front surface portion of the first guide rib 255. The reason why the cut-out portion 255a is formed will be described in detail below with reference to the drawings.

In addition, an elastic member accommodation portion 254 for accommodating the elastic member 272 may be formed at the lower end of the second guide rib 256. Specifically, it suffices that the elastic member accommodation portion 254 has space which is capable of accommodating the elastic member 272 therein.

As illustrated in the cross-sectional view of FIG. 7, the shielder 26 is supported by the first and second guide ribs 255 and 256, and rotates together with the case cover 25 about the hinge shaft 29 as one body.

Figure 8:
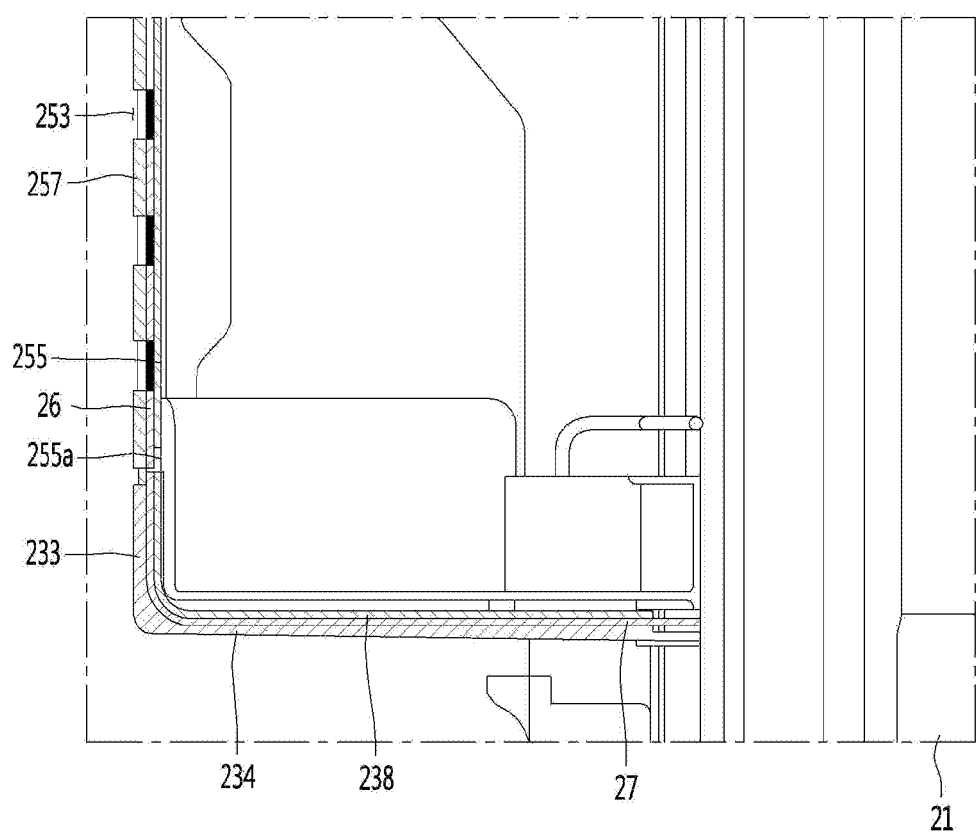
FIG. 8 is a longitudinal sectional view taken along line 4-4 in FIG. 2 in a state where the outer door is opened.

FIG. 8 is a longitudinal sectional view taken along line 4-4 in FIG. 2 in a state where the outer door is opened.

With reference to FIG. 8, in a state where the outer door 21 is opened, that is, in a state where the rear surface of the outer door 21 is separated from the front surface of the inner door 22, the pressing protrusion 214 is separated from the front end of the guide bar 271.

Specifically, in a case where the pressing protrusion 214 is separated from the guide bar 271, the load of the shielder 26 and the restoring force of the elastic member 272 cause the shielder 26 to be in a state of being lowered. In this state, the shielding portion of the shielder 26 shields the cool air holes 253 of the case cover 25. Therefore, cool air or external air does not flow into the accommodation case 23. Of course, the state is limited to a case where the upper cool air inflow hole 235 and the side cool air inflow hole 237 are not formed in the accommodation case 23.

For example, when the inner door 22 is closed and only the outer door 21 is opened in a structure of the accommodation case 23 which does not have the upper cool air inflow hole 235 and the side cool air inflow hole 237, since the shielder 26 shields the cooling air holes 253 of the case cover 25, the cool air inside the refrigerating chamber 114 does not flow into the accommodation case 23.

In addition, the hot air outside the refrigerator can flow into the accommodation case 23, but does not flow into the refrigerating chamber 114. Therefore, in a case where only the outer door 21 is opened, there is no increase in the load of the refrigerating chamber 114 due to the inflow of external air.

The rear end portion of the guide bar 271 is positioned at the same height as the lower end of the opening portion formed in the rear surface of the accommodation case 23 or at a position lower than the lower end of the opening portion. Therefore, the rear end of the guide bar 271 does not interfere with the case cover 25 even the case cover 25 is opened in a state where merle outer door 21 and the inner door 22 are opened.

Figure 9:
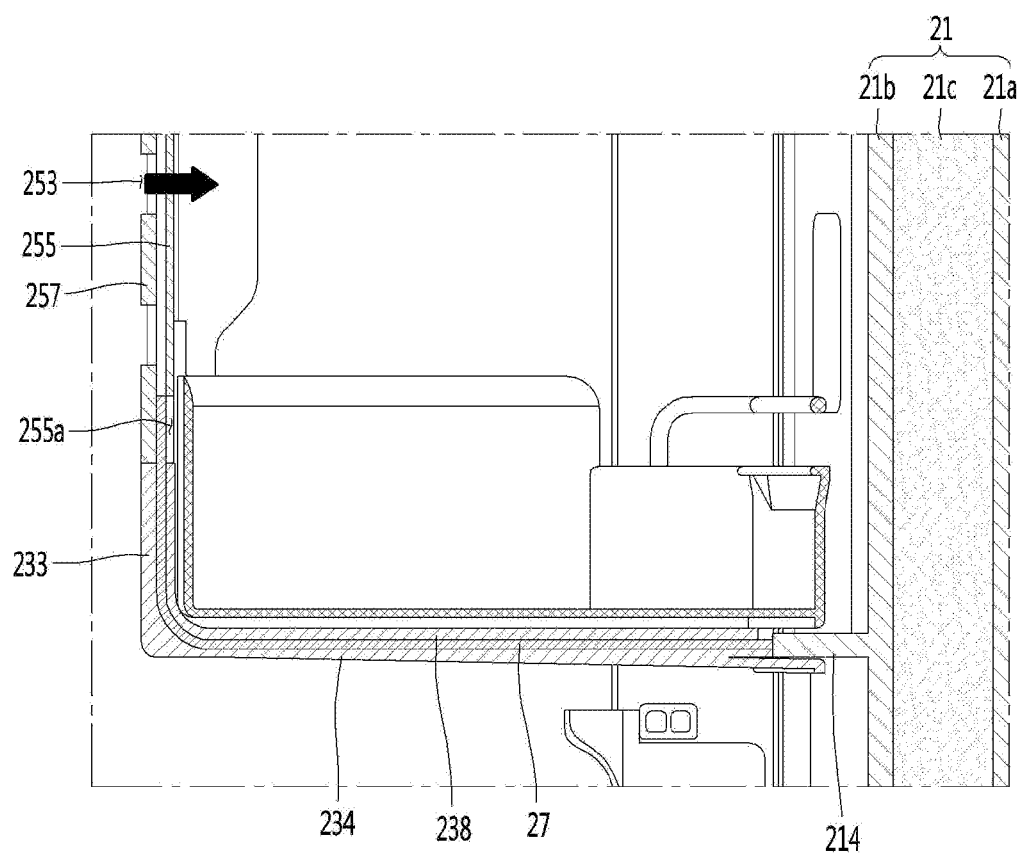
FIG. 9 is a longitudinal sectional view taken along line 4-4 in FIG. 2 in a state where the outer door is closed.

FIG. 9 is a longitudinal sectional view taken along line 4-4 in FIG. 2 in a state where the outer door is closed.

With reference to FIG. 9, in a state where the outer door 21 is closed, that is, in a state where the rear surface of the outer door 21 is in close contact with the front surface of the inner door 22, the pressing protrusion 214 presses the front end portion of the guide bar 271.

Specifically, when the pressing protrusion 214 pushes the front end portion of the guide bar 271, the guide bar 271 is retracted and the rear end portion of the guide bar 271 is lifted and protrudes from the lower end portion of the opening portion formed on the rear surface of the accommodation case 23.

The rear end portion of the guide bar 271 is lifted and the lower end portion of the shielder 26 is pushed up so that the elastic member 272 is stretched. At the same time, the opening portion 262 of the shielder 26 and the cool air holes 253 of the case cover 25 communicate with each other.

In a state where the inner door 22 is closed so that the accommodation case 23 is accommodated in the refrigerating chamber 114 when the outer door 21 is closed, the refrigerating chamber cool air flows through the opening portion 262 and the cool air holes 253 into the accommodation case 23. Since the opening area of the rear surface of the accommodation case 23 approximately corresponds to half of the rear surface of the accommodation case 23, a large amount of the refrigerating chamber cool air can flow into the accommodation case 23 in a short time. Therefore, even if external air flows into the accommodation case 23 in a state where the outer door 21 is opened, since a large amount of the refrigerating chamber cool air flows into the accommodation case 23 at the same time closing the outer door 21, the load inside the accommodation case 23 is quickly reduced. Therefore, food stored in the accommodation case 23 can be stored for a long period without going bad.

Meanwhile, in a case where the inner door 22 is opened in a state where the outer door 21 is closed and the user rotates and opens the case cover 25 in this state, the rear end portion of the guide bar 271 protruding upward from the lower end of the rear opening portion of the accommodation case 23 and the case cover 25 may interfere with each other. In order to prevent this, the cut-out portion 255*a* is formed on the front surface of the first guide rib 255.

Specifically, when the case cover 25 is rotated, since the protruding rear end portion of the guide bar 271 passes through the cut-out portion 255*a*, the case cover 25 can be opened.

Alternatively, a separate member such as the case cover 25 may not be provided on the rear surface portion of the accommodation case 23 in a form of a door. In other words, the plurality of cool air holes are formed on the rear surface portion of the accommodation case 23 in the vertical direction, and the shielder 26 is slidably connected to the rear surface portion of the accommodation case 23 to selectively shield the cool air holes. In a case of this structure, it is possible to store food into the accommodation case 23 only through the access hole 221.

Figure 10:
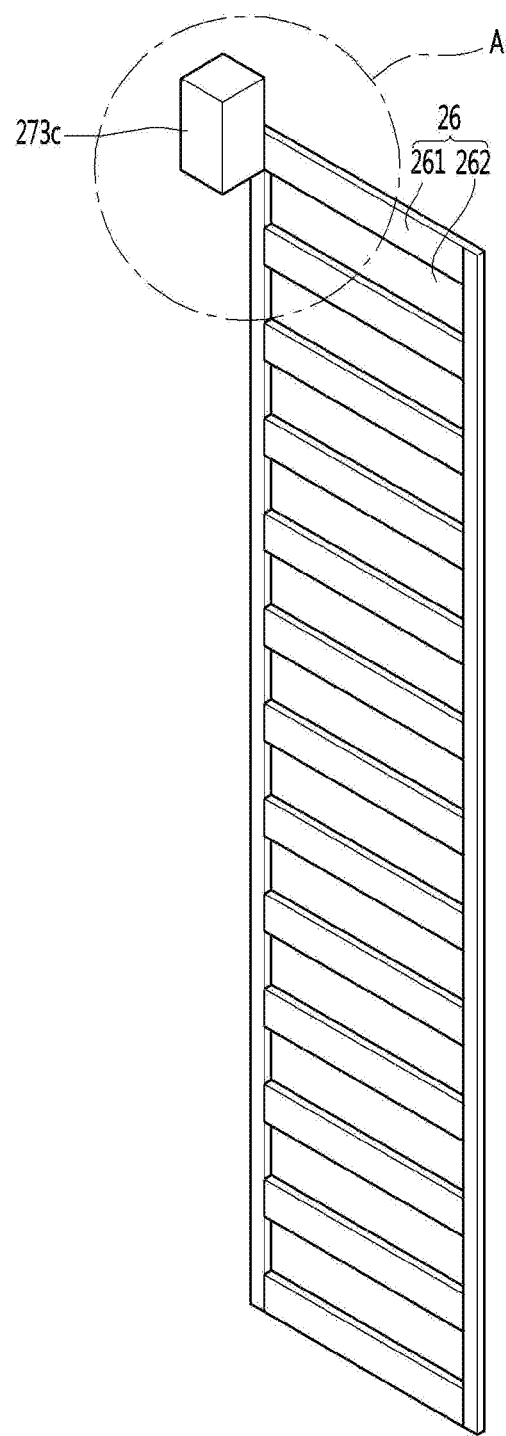
FIG. 10 is a perspective view illustrating a shielding module according to another embodiment of the present invention.
Figure 11:
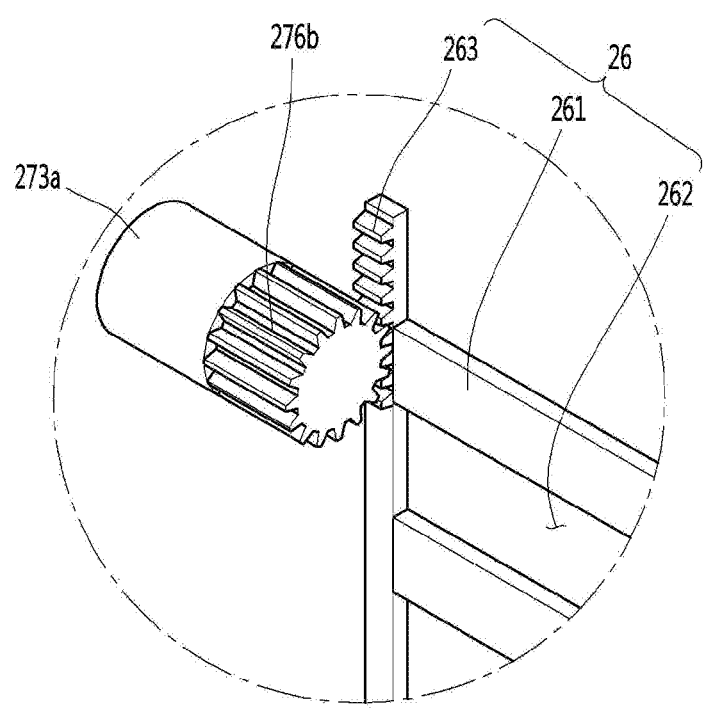
FIG. 11 is an enlarged perspective view illustrating portion A in FIG. 10.

FIG. 10 is a perspective view of a shielding module according to another embodiment of the present invention, and FIG. 11 is an enlarged perspective view illustrating portion A of FIG. 10.

With reference to FIGS. 10 and 11, the shielding module 24 according to the present embodiment detects the opening of the door through the door switch, unlike the previous embodiment, and the driving motor operates according to the detected opening state of the door so that the rear opening portion of the accommodation case 23 is opened or shielded.

Specifically, the shielding module 24 according to another embodiment of the present invention may include a case cover 25, a shielder 26 which is connected to the front surface of the case cover 25 so as to be capable of being lifted or lowered, and drive means 27 which provides a driving force such that the shielder 26 is lifted or lowered.

Here, the configuration in which the opening portion 262 and the shielding portion are alternately disposed on the shielder 26 in the up and down direction is same as the configuration of the shielder 26 proposed in the previous embodiment. The structure in which the case cover 25 is installed on the rear surface of the accommodation case 23 so as to be rotatable about a hinge shaft and a structure in which a plurality of cool air holes 253 are disposed on the case cover 25 in the up and down direction are the same as the case cover 25 proposed in the previous embodiment.

A structure in which the shielder 26 is lifted so that the opening portion 262 and the cooling hole 253 communicate with each other or the shielder 26 is lowered so that the cool air holes 253 are shielded by the shielding portion of the shielder 26 is also the same as the previous embodiment.

However, in the driving mechanism of the driver 27, it can be said that the driver 27 which drives the shielder 26 and the driver 27 proposed in the previous embodiment differ from each other.

Specifically, in this embodiment, the driver of the shielder 26, that is, the pressing protrusion 214, the guide bar 271, and the elastic member 272, proposed in the previous embodiment are not applied. Instead, the drive means 27 according to the present embodiment includes a driving motor assembly 273.

More specifically, the driving motor assembly 273 may include a driving motor 273a, a pinion 273b which is connected to the rotation shaft of the driving motor 273a, and a motor case 273c which covers and protects the driving motor 273a and the pinion 273b.

In addition, the shielder 26 includes a shielding main body 261, a left frame and a right frame which define the left and right edges of the shielding main body 261, and a plurality of opening portions 262 which are formed on the shielder 261, as in the previous embodiment, and in addition to these, further includes a guide rack 263 which engages with the pinion 273b on the left frame or the right frame.

Specifically, the driving motor assembly 273 may be positioned at the upper end edge as well as at the lower end edge of the shielder 26, and may be positioned at the center of the side end portion according to design conditions. Also, the guide rack 263 may be formed at a position corresponding to the position of the driving motor assembly 273.

Figure 12:
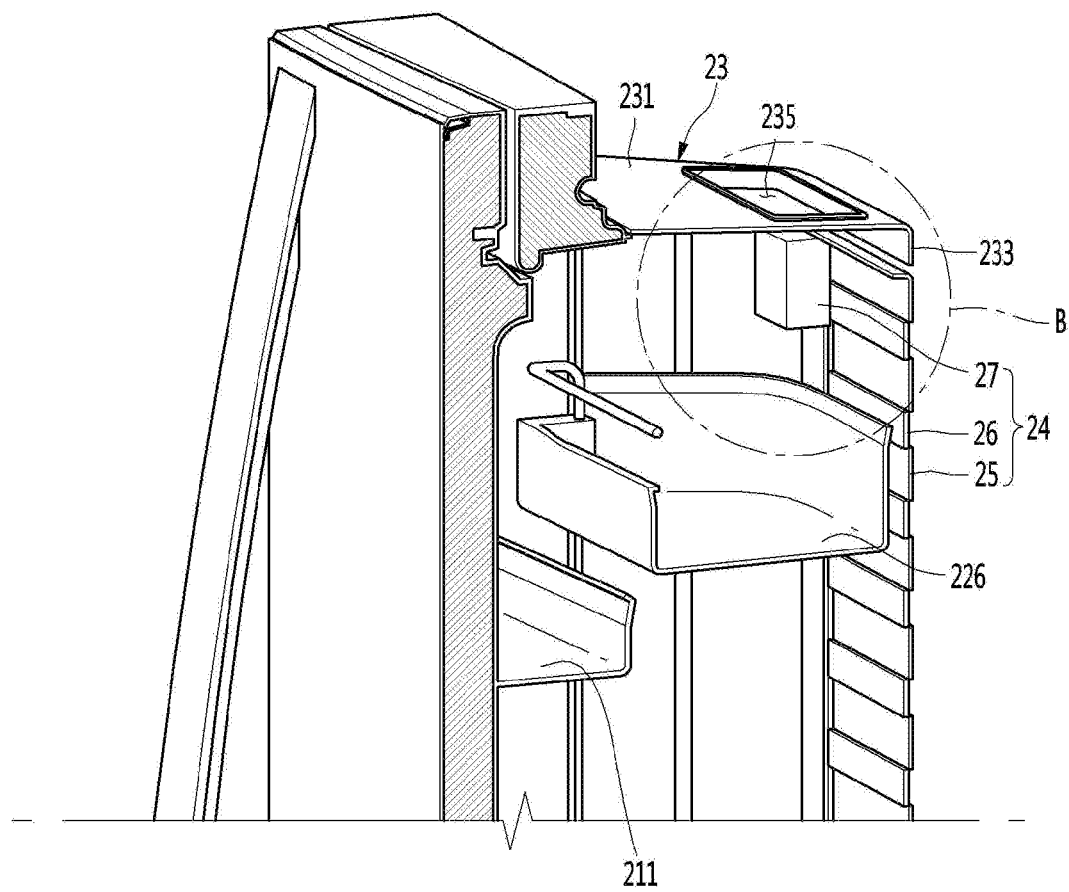
FIG. 12 is a partially cutaway perspective view of a refrigerating chamber door assembly provided with a shielding module according to another embodiment of the present invention.
Figure 13:
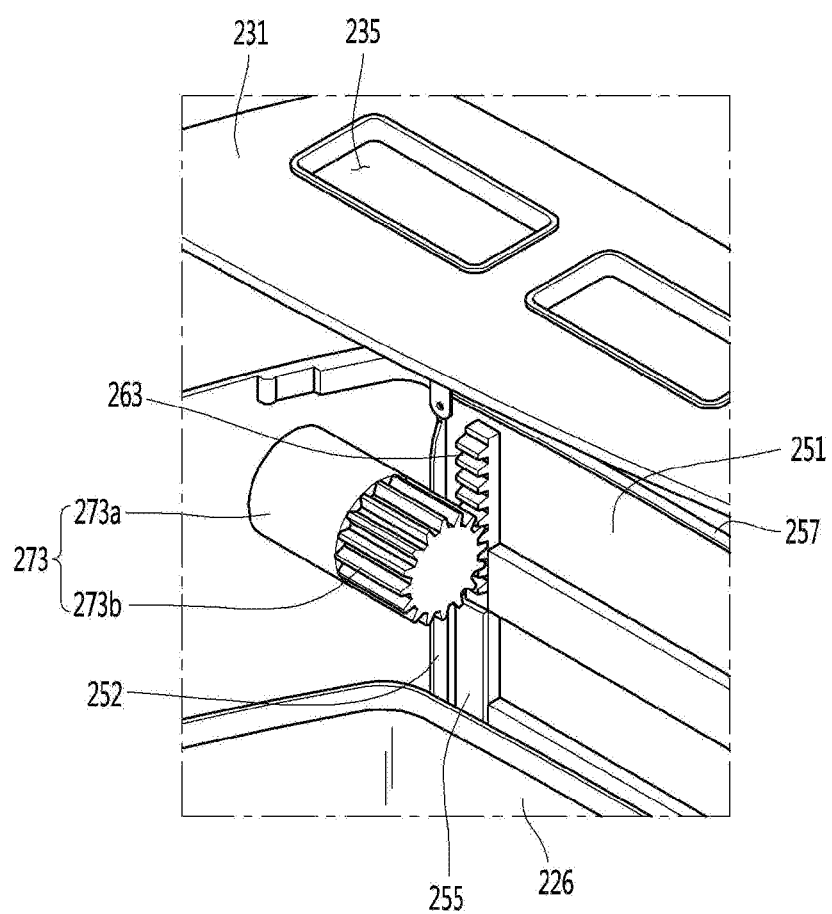
FIG. 13 is an enlarged view illustrating portion B in FIG. 12 where the motor case is removed.

FIG. 12 is a partially cutaway perspective view of a refrigerating chamber door assembly with a shielding module according to another embodiment of the present invention, and FIG. 13 is an enlarged view of portion B in FIG. 12 where the motor case is removed.

With reference to FIGS. 12 and 13, the refrigerating chamber door assembly 20 on which the shielding module according to the present embodiment is mounted is the same as the refrigerating chamber door assembly described in the previous embodiment.

In addition, the shielding module 24 according to the present embodiment also includes a shielder 26, and a case cover 25 which is connected to the shielder 26 so as to be slidable in the up and down direction, as in the previous embodiment.

The case cover 25 is rotatably coupled to the accommodation case 23 so as to shield the opening portion of the rear surface of the accommodation case 23, as in the previous embodiment. Therefore, a first guide rib 255 and a second guide rib 256 are formed on the front left and right edges of the case cover 25, respectively. The shielder 26 is guided by the first and second guide ribs 255 and 256 and stably moves in the up and down direction.

Specifically, as illustrated in FIG. 12, the driving motor assembly 273 is fixedly mounted on the edge of the front surface portion of the case cover 25 and can rotate together with the case cover 25 as one body.

Alternatively, a structure in which the driving motor assembly 273 may be fixedly mounted on the inner side of the accommodation case 23 and in which, when the case cover 25 is closed, the guide rack 263 is engaged with the pinion 273b can also be proposed.

Meanwhile, the driving motor 273a operates according to the door opening detected by the door switch.

Specifically, the door switch includes a first door switch which is installed on an edge of the front surface of the cabinet 11 to detect opening or closing of the inner door 22, and a door switch 222 (which may be defined as second door switch) which is installed on the front surface of the inner door 22.

A signal detected by each of the door switches is transmitted to a main control unit (not illustrated) of the refrigerator 10 so that the open or closed state of the inner door 22 or the outer door 21 is determined.

In addition, based on the door opening or closing signal transmitted from the door switches, the main control unit transmits a driving signal of the driving motor 273a to a motor driver (net illustrated). Then, the motor driver controls power supply for driving the driving motor 273a.

Here, the driving signal of the driving motor 273a may be a signal for determining the rotation direction of the driving motor 273a. In other words, according to a door opening or closing signal transmitted from the door switches, the driving motor 273a rotates in the first direction to cause the shielder 26 to be lifted, or to rotate in the second direction to cause the shielder 26 to be lowered.

In addition, when the shielder 26 is lifted, the cool air hole 253 of the case cover 25 may be opened and when the shielder 26 is lowered, the cool air hole 253 may be shielded, as in the previous embodiment.

Specifically, when a control signal for rotating the driving motor 273a in the first direction is transmitted to the motor driver, the pinion 252 connected to the rotation shaft of the driving motor 273a rotates to cause the guide rack 263 to be lifted.

Conversely, when a control signal for rotating the driving motor 273a in the second direction (opposite direction to first direction) is transmitted to the motor driver, the pinion 252 rotates in the opposite direction to cause the guide rack 263 to be lowered.

Meanwhile, a case where the driving motor 273a rotates in the first direction and the cool air holes 253 of the case cover 25 are opened is a case closing signals of the inner door 22 and the outer door 21 from the first door switch and the second door switch are transmitted. In this case, since the inside of the refrigerating chamber is completely blocked from the external air, the cool air holes 253 are opened to allow the refrigerating chamber cool air to flow into the accommodation case 23.

Otherwise, for example, the driving motor 273a rotates in the second direction so that the cool air holes 253 are shielded even if only anyone door of at least one of the outer door 21 and the inner door 22 is opened.

Specifically, in a case where only the outer door 21 is opened, hot air from the outside can flow into the accommodation case 23 through the access hole 221 of the inner door 22. Since the hot air flowing into the accommodation case 23 can flow into the refrigerating chamber 114, the cool air holes 253 have to be kept in a shielded state.

In addition, in the case where only the inner door 22 is opened, since external hot air can be introduced into the accommodation case 23 through the cool air holes 253, the cool air holes 253 have to be kept in a shielded state.

In summary, only in a case where both inner door 22 and outer door 21 are closed, the driving motor 273a rotates in the first direction so that the cool air holes 253 are opened.

When it is determined that any one of the inner door 22 and the outer door 21 is opened, the cool air holes 253 are closed.

As described above, when the shielding module 24 is driven by using the driving motor assembly, since inflow of external air into the accommodation case provided on the rear surface of the door can be blocked, there is an advantage that the phenomenon that the food stored in the accommodation case goes bad can be minimized.

The invention claimed is:

1. A refrigerator comprising:
 a cabinet that has a storage chamber configured to store food items therein, the storage chamber comprising at least one of a refrigerating chamber, a freezing chamber, or a switching chamber, the switching chamber being configured to maintain a refrigerating temperature or a freezing temperature;
an inner door that is rotatably connected to a side edge of a front surface of the cabinet and that is configured to open and close a portion of the storage chamber, the inner door defining an access hole having a predetermined size;
an accommodation case that is mounted on a rear surface of the inner door, the accommodation case having:
  a front surface that is opened and in communication with the access hole, and
  a rear surface that defines a plurality of cool air holes that are vertically spaced apart from each other;
an outer door rotatably connected to the inner door and located at a front side of the inner door, the outer door being configured to selectively open and close the access hole;
a hinge assembly comprising:
  a first hinge that rotatably connects a first side edge of the inner door to the cabinet, and
  a second hinge that rotatably connects a first side edge of the outer door to the first side edge of the inner door;
a shielder movably coupled to the rear surface of the accommodation case and configured to selectively shield the plurality of cool air holes;
a driver comprising a guide bar that is provided in the accommodation case, that is configured to move the shielder in a vertical direction relative to the accommodation case, and that extends along a lower surface of the accommodation case and the rear surface of the accommodation case, the guide bar having a front end portion that is exposed to a front surface of the inner door, and a rear end portion that is positioned at a lower end of a first side of the shielder; and
a pressing protrusion that protrudes from a rear surface of the outer door toward the inner door, the pressing protrusion being configured to, based on the outer door being closed, push the front end portion of the guide bar in a rear direction such that the rear end portion of the guide bar pushes upward the lower end of the shielder.

2. The refrigerator according to claim 1, wherein a second side of the shielder is laterally spaced apart from the first side of the shielder and configured to stretch based on the shielder moving upward relative to the accommodation case, the second side of the shielder having:
  a first end disposed at a lower end of the second side of the shielder; and
  a second end fixed to the accommodation case, and
  wherein the first end is configured to move away from the second end based on the shielder moving upward relative to the accommodation case.

3. The refrigerator according to claim 2, further comprising:
  an opening portion defined at the rear surface of the accommodation case; and
  a case cover that is rotatably mounted at an edge of a side surface of the opening portion and that is configured to open and close the opening portion,
  wherein the case cover defines the plurality of cool air holes, and
  wherein the shielder is mounted on the case cover.

4. The refrigerator according to claim 3, further comprising:
  guide ribs that are located at left and right edges of the case cover, respectively, and that are configured to guide movement of the shielder.

5. The refrigerator according to claim 3, wherein the shielder is configured to, based on the outer door being opened and the front end portion of the guide bar moving forward, move to a lower position by a load of the shielder.

6. The refrigerator according to claim 5, wherein the shielder defines a plurality of opening portions that are vertically spaced apart from each other and that are configured to be in communication with the plurality of cool air holes, respectively, based on the shielder moving to an upper position that is vertically above the lower position, and
  wherein the shielder is configured to cover the plurality of cool air holes based on the shielder moving to the lower position.

7. The refrigerator according to claim 2, wherein the shielder is configured to, based on the outer door being opened and the front end portion of the guide bar moving forward, move to a lower position by a load of the shielder.

8. The refrigerator according to claim 7, wherein the shielder defines a plurality of opening portions that are vertically spaced apart from each other and that are configured to be in communication with the plurality of cool air holes, respectively, based on the shielder moving to an upper position that is vertically above the lower position, and
  wherein the shielder is configured to cover the plurality of cool air holes based on the shielder moving to the lower position.

9. The refrigerator according to claim 1, wherein the guide bar is configured to bend and move along the lower surface the accommodation case and the rear surface of the accommodation case.

10. The refrigerator according to claim 9, wherein the guide bar is configured to, while the rear end portion of the guide bar pushes up the shielder, maintain a shape that extends along the lower surface of the accommodation case and the rear surface of the accommodation case.

11. The refrigerator according to claim 1, wherein the driver further comprises a driving motor and a pinion gear, the pinion gear being configured to, based on rotation of the driving motor, engage with a guide rack gear of the shielder and move the shielder in the vertical direction relative to the accommodation case.

12. The refrigerator according to claim 11, wherein the guide rack gear of the shielder is defined at an upper end of the shielder.

* * * * *